(12) United States Patent
Laurent

(10) Patent No.: US 6,487,271 B1
(45) Date of Patent: Nov. 26, 2002

(54) METHOD AND SYSTEM OF SATURATION MANAGEMENT OF RADIOGRAPHIC IMAGE

(75) Inventor: Claire Laurent, Voisins le Bretonneux (FR)

(73) Assignee: GE Medical Systems SA (FR)

( * ) Notice: Subject to any disclaimer, the term of this patent is extended or adjusted under 35 U.S.C. 154(b) by 0 days.

(21) Appl. No.: 09/619,249

(22) Filed: Jul. 19, 2000

(30) Foreign Application Priority Data

Jul. 19, 1999 (FR) .......................................... 99 09342

(51) Int. Cl.$^7$ ................................................ H05G 1/64
(52) U.S. Cl. ..................... 378/98.9; 378/98.7; 382/132; 382/282
(58) Field of Search ..................... 378/37, 98.7, 98.12, 378/108, 98.11, 98.9; 382/132, 282, 283

(56) References Cited

U.S. PATENT DOCUMENTS

| | | | |
|---|---|---|---|
| 4,891,757 A | | 1/1990 | Shroy et al. ............ 364/413.13 |
| 5,020,085 A | * | 5/1991 | Kawara et al. ........... 378/98.11 |
| 5,081,659 A | * | 1/1992 | Dobbbins, III ............. 378/98.2 |
| 5,572,565 A | | 11/1996 | Abdel-Mottaleb ........... 378/37 |
| 5,982,953 A | * | 11/1999 | Yanagita et al. ............ 382/294 |
| 6,041,135 A | * | 3/2000 | Buytaert et al. ............ 382/132 |

FOREIGN PATENT DOCUMENTS

EP          0654761          5/1995

* cited by examiner

Primary Examiner—David P. Porta
Assistant Examiner—Chih-Cheng Glen Kao
(74) Attorney, Agent, or Firm—Jay L. Chaskin

(57) ABSTRACT

Method of saturation management of a digital radiographic exposure image in which there are one or more saturation areas, acquired notably after a mammogram on an acquisition chain in automatic mode using a low-dose preexposure image.

A mask is made from the exposure image by taking the saturation areas into account;
    the coverage areas corresponding to the saturation areas of the exposure image are determined on the preexposure image by using the the mask;
    a digital standardization processing of the gray levels of both the exposure image and the preexposure image is then carried out; and
    the final image is determined from a combination of the two images thus processed.

36 Claims, 3 Drawing Sheets

METHOD AND SYSTEM OF SATURATION MANAGEMENT OF RADIOGRAPHIC IMAGE

BACKGROUND OF THE INVENTION

The invention concerns the saturation management of an image of an object of high dynamics, that is, presenting too great a variation between the lowest and highest detectable gray level.

It is particularly applicable in the medical field, especially for mammograms in which the thick tissue displays on the image a high dynamics sometimes greater than that of the X-ray detector.

In the medical field, physicians generally use radiographic images of the internal organs of patients to make their diagnosis. The images are obtained by means of an acquisition chain notably including a detector. Each detector possesses a specific dynamics and can therefore register up to a certain maximum level of X-ray exposure called saturation level. If that saturation level is exceeded in an area, all the information is lost in that area. Thus, on a mammogram, the area close to the skin can be partially erased.

In the course of automatic mammography, two images are made:
- a first low-dose preexposure image (saturation is thus avoided) from which certain characteristics of the breast are determined, such as its composition and its radiological thickness. That preexposure image is no longer subsequently used;
- a second normal-dose exposure image from which the physician makes his diagnosis.

However, this method of operation does not make it possible to solve possible saturation problems that can occur during the exposure phase. In fact, the object to be X-rayed presents a dynamics which can be more or less appreciable in any given area and the detector of the image chain also possesses its own dynamics. Saturation occurs when the dynamics of the detector is less than that of the object to be X-rayed. Some information close to the skin can be lost.

The invention is aimed at contributing a solution to that problem and, in particular, at making it possible to obtain a digital radiographic image of a body organ whose contour is precisely detected regardless of the dynamics of the organ.

BRIEF SUMMARY OF THE INVENTION

The invention proposes a method of saturation of a digital radiographic exposure image, in which there are one or more saturation areas. The image is obtained following a mammogram on an acquisition chain in automatic mode, using a preexposure image.

According to a general characteristic of the invention, a final image is constructed from the the exposure image and preexposure image.

The invention proposes using the preexposure image obtained in the course of a mammogram in automatic mode in order to recover the information lost by saturation during exposure.

The use of the preexposure image is therefore generally limited to obtaining the characteristics of the organ X-rayed the pre-exposure image is obtained from an X-ray flash at low enough dose not to involve any saturation area. The exposure image, on the other hand, is obtained from X-radiation at normal dose higher than that of the preexposure image and thus entails possible saturation areas.

The invention preferably provides for making a mask from the exposure image by taking the saturation areas into account, and then determining on the preexposure image the areas corresponding to the saturation areas of the exposure image by using the mask. The areas thus obtained are called coverage areas. The area complementing the junction of coverage areas is set at a zero gray level. A digital standardization processing of certain gray levels of both exposure and preexposure images is then carried out and the final image is determined from a combination of the two images thus processed.

According to an embodiment of the invention, the mask is made by detecting all the gray levels higher than a saturation gray level linked to the detector of the acquisition chain.

The mask is, in fact, made by keeping in memory the coordinates of the pixels thus detected. These coordinates make it possible to delimit the saturation areas and, by transferring them on the preexposure images, the pixels of the preexposure image are determined, the coordinates of which are identical to those of the pixels of the saturation areas.

It will be readily apparent to one skilled in the art that this masking operation is correctly carried out only if the two images are perfectly superposable. The two images can, if necessary, undergo a treatment of resetting relative to each other.

In general, according to one embodiment of the invention, the digital standardization processing can be carried out by enhancing the gray level of the coverage areas on the the preexposure image to the same gray level as the unsaturated areas of the the exposure image.

In fact, the pixels of the coverage areas have, on the average, a gray level much lower than that of the exposure image, for the preexposure image is made following a low-dose radiation. The object of the standardization operation is to ensure continuity between the coverage areas of the preexposure image and the unsaturated areas of the exposure image. This operation is of interest only if it is carried out homogeneously, that is, all the pixels of the coverage areas are augmented by the same quantity. This makes it possible to preserve the contrasts and, therefore, always to be able to distinguish the elements of interest.

Finally, the final image is obtained by joining the unsaturated areas of the exposure image with the enhanced coverage areas of the preexposure image.

The final image is therefore composed of the exposure image in which all the saturated areas are replaced by homologous areas of the preexposure image having undergone a digital processing. The information from the saturated areas is thus partly recovered.

According to another embodiment of the invention, the mask is limited to a saturated part of the exposure image corresponding to a peripheral region of the breast X-rayed. The information recovered then makes it possible to delimit the breast precisely.

The limitation of the mask to a small part of the image results in accelerating processing, since the number of pixels processed is less than the number of pixels processed in the case of a mask made on all the saturated areas.

The invention also concerns a system of saturation management of the exposure image. This system comprises:
- an acquisition chain capable of elaborating, in addition to the exposure image containing at least one saturation area, a second preexposure image of weaker gray level;

an image processing system containing a means of detection of the pixels of the saturated area of the exposure image in order to form a mask, a means of detection of a coverage area on the second image, the coordinates of whose pixels correspond to the coordinates of the pixels of the saturated area of the exposure image, a means of enhancement of the gray levels of the coverage area to the same gray level as the unsaturated area of the exposure image and a means of addition of the enhanced coverage area of the second image with the unsaturated area of the exposure image in order to obtain the unsaturated final image; and at least one system of display of the final image.

The digital image processing system therefore performs all the digital operations involving pixels. This system receives the images direct from the acquisition chain, but it can also obtain them from a digital data storage means on a noninstantaneous diagnosis.

The display system can consist of a video monitor and/or a printer connected to the image processing system.

According to an advantageous embodiment of the invention, the acquisition chain operates on automatic mode, for which a first low-dose flash supplies a preexposure image and a normal-dose radiation supplies an exposure image; the preexposure image therefore corresponds to the second image.

The invention is remarkable in that it uses the preexposure image on an automatic operation of the acquisition chain.

In fact, the image is ordinarily used only to determine certain parameters of the body organ X-rayed, but not at all for formation of the digital radiographic image.

Other advantages and characteristics of the invention will appear on examination of the detailed description of a nonlimitative embodiment and of the attached figures, in which:

DETAILED DESCRIPTION OF THE INVENTION

Although the invention is not limited thereto, the application of the invention to construction of the unsaturated radiographic image of the breast is now going to be described.

Figure 1:
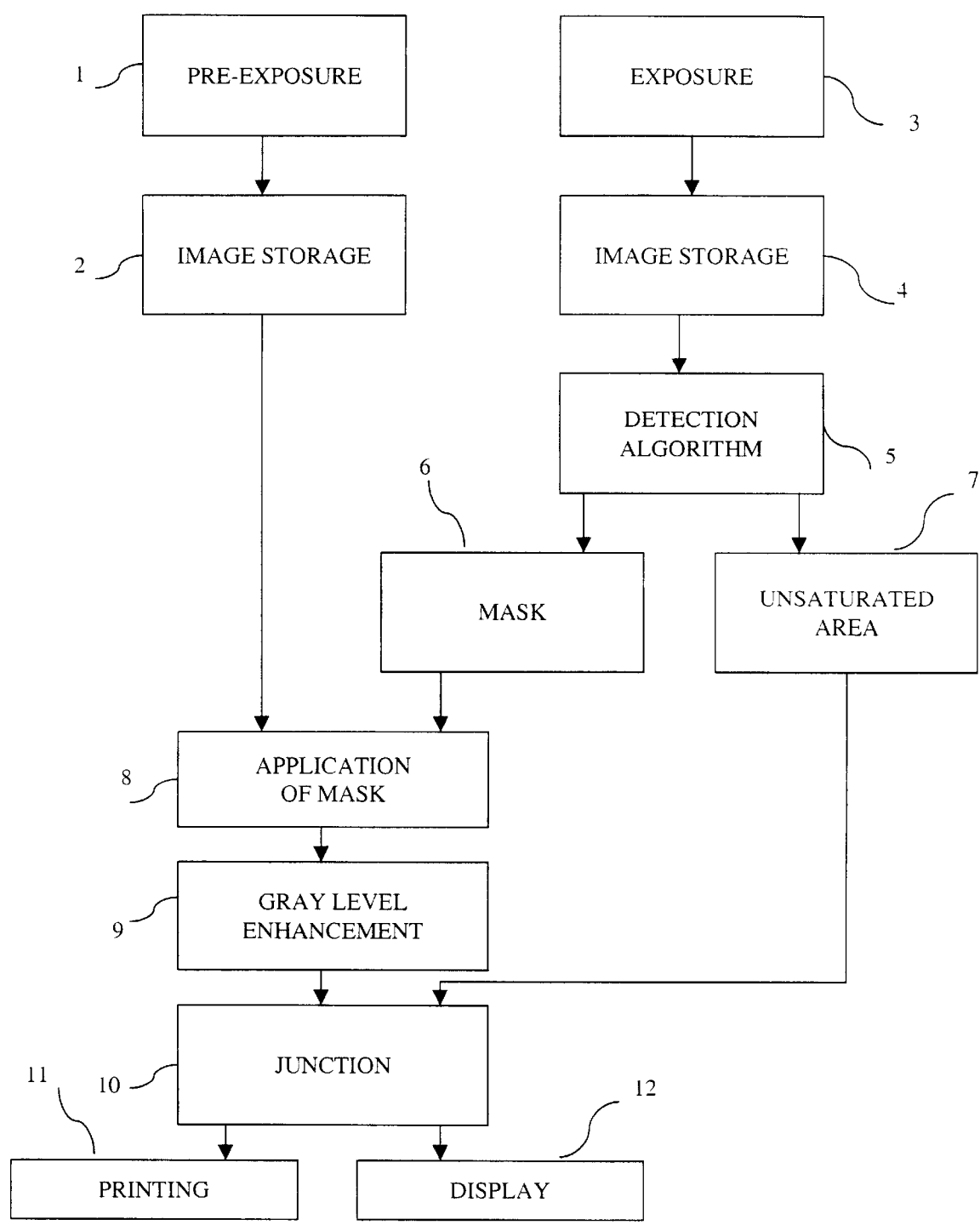
FIG. 1 is a flow chart of a mode of use of the method according to an embodiment of the invention.
Figure 2:
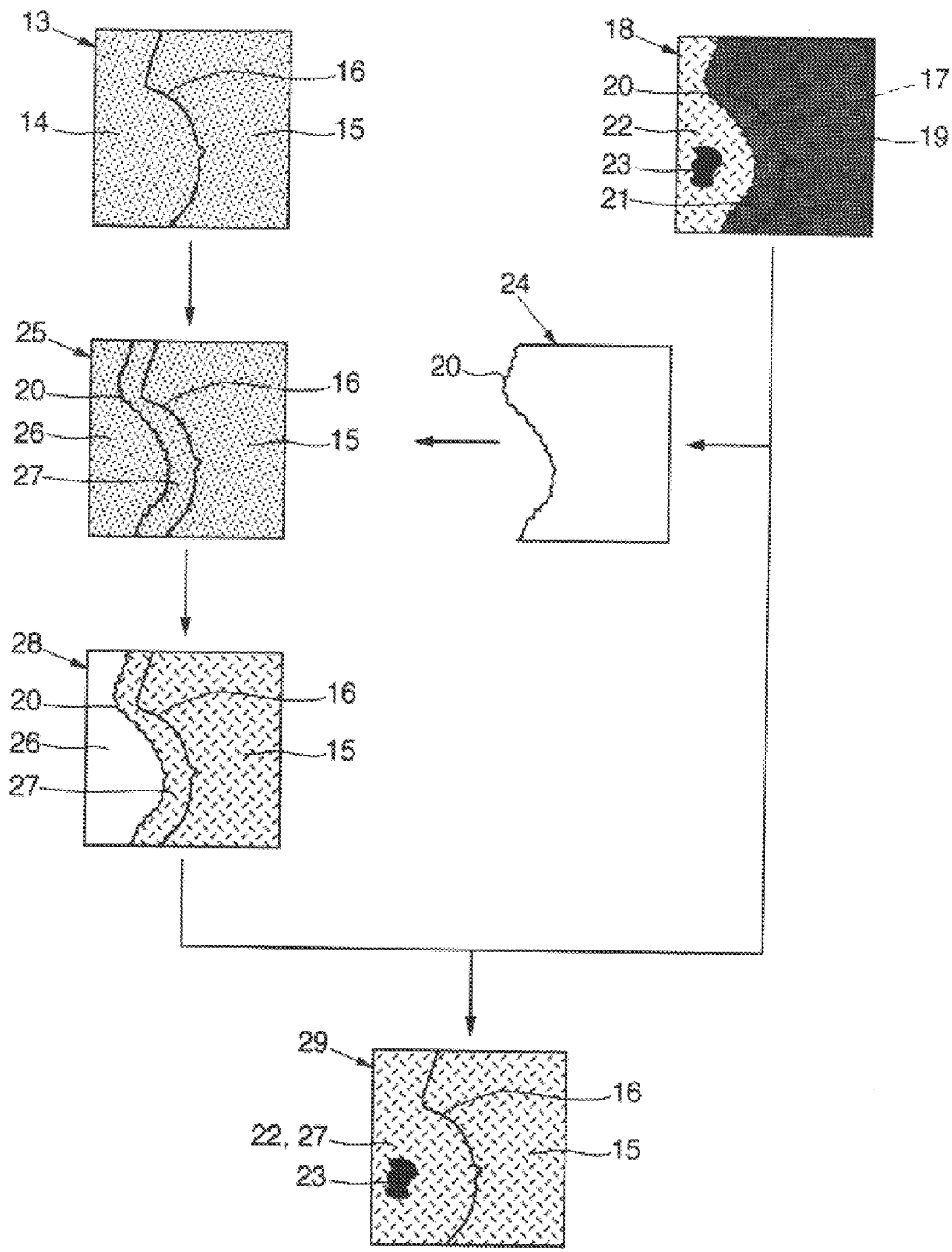
FIG. 2 schematically illustrates the construction of the final image.

Referring to FIGS. 1 and 2, the method of the invention comprises, first of all, of making a low-dose preexposure in the course of stage 1, so as to store during stage 2 a preexposure image 13 visible in FIG. 2. The image 13 presents a very weak uniform gray level. The contour 16 is the border of the breast with an upper part that can, for example, represent a pectoral muscle. Area 15 represents the space outside the breast, while area 14 represents the space inside the breast, for which the image does not offer a quality sufficient to make any diagnosis. The advantage of this image 13 resides in the fact that it presents a well determined contour of the breast 16. In general, low-dose X-radiation avoids saturation and makes it possible to X-ray a complete object of high dynamics.

An exposure is then made automatically, following the low-dose preexposure, in the course of stage 3 under X-rays at normal dose, that is, a sufficient dose ordinarily used to make possible the detection of elements of interest present in the breast X-rayed. This exposure makes it possible to obtain the exposure image 18 in FIG. 2, which is also stored in the course of stage 4.

The image 18 presents two areas 19 and 22. Area 22 representing the space inside the breast is unsaturated, so that the quality of the image is sufficient to make a diagnosis. An element of interest 23 can be distinguished inside the breast. Area 19 is a saturated region in which no information is available. This saturation area presents no contrast. The border between the two areas is a contour 20. Contour 20 is not the limit of the breast. A part of the breast, essentially the region near the border, is not visible, for it forms part of the saturated area 19.

Image 18 does not make it possible to determine the limit of the breast exactly. A user examining image 18, without taking image 13 into account, does not know what is the part of the breast close to the edge which is included in the saturated area 19.

By superposing the two images 18 and 13, the dotted curve 17 is the projection of the contour 16, delimiting the breast, on image 18. The method according to the invention is essentially going to make it possible to recover at least the area 21 lying between contours 16 and 20. It is therefore desirable to render area 21 unsaturated with a gray level identical to that of area 22.

Considering the exposure image 18, a computer algorithm makes it possible to detect in the course of stage 5 all of the pixels having a gray level higher than a maximum gray level actually corresponding to the saturation gray level of the detector of the acquisition chain.

The coordinates of those pixels are then determined in the course of stage 6 in relation to the size of the image. This set of coordinates forms a mask 24 illustrated in FIG. 2, that is, the coordinates are the image of a part of the exposure image 18, in this case the saturated part 19. The coordinates of the unsaturated pixels are also determined in the course of stage 7. The coordinates of the pixels of area 21 form part of the mask 24.

Then, the preexposure image 13 is of interest. The mask 24 is applied to it in the course of stage 8. In other words, every pixel whose coordinates are included in the mask 24 is registered. The unsaturated pixels homologous to the saturated pixels of image 18 are thus distinguished on image 13. The area of pixels thus distinguished is called coverage area, which is illustrated by areas 15 and 27 on image 25 of FIG. 2. Area 27 on image 25 is delimited by contours 16 and 20. Area 27 therefore corresponds to area 21, which it is desired to improve, on image 18.

The gray level of the pixels of the coverage area (15 and 27) are then enhanced in the course of stage 9 until reaching the gray level of the pixels of the unsaturated area 22 of image 18.

Furthermore, an area 26, complementing the coverage area (15 and 27), is set at a zero gray level. Area 26 corresponds to area 22 on the exposure image 18. Image 28 of FIG. 2 shows the area 26 set at zero and the coverage area (15 and 27) enhanced to a gray level identical to that of area 22 of image 18.

The gray level enhancement operations render area 27 exploitable, since the resolution is now identical to that of part 22 of the exposure image. The information lost in area 19 following exposure 30 is recovered here. The uniform enhancement enables the contour 16 of the breast to be always distinguished in image 28.

The enhanced coverage area 15 and 27 of image 28 is then joined in the course of stage 10 with the unsaturated area 22 of image 18. An unsaturated final image 29 is thus formed, in which the contour of the breast is distinguished exactly. The user thus sees the entire breast X-rayed.

The user can then print that image 29 through stage 11 or display it on a screen through stage 12.

Figure 3:
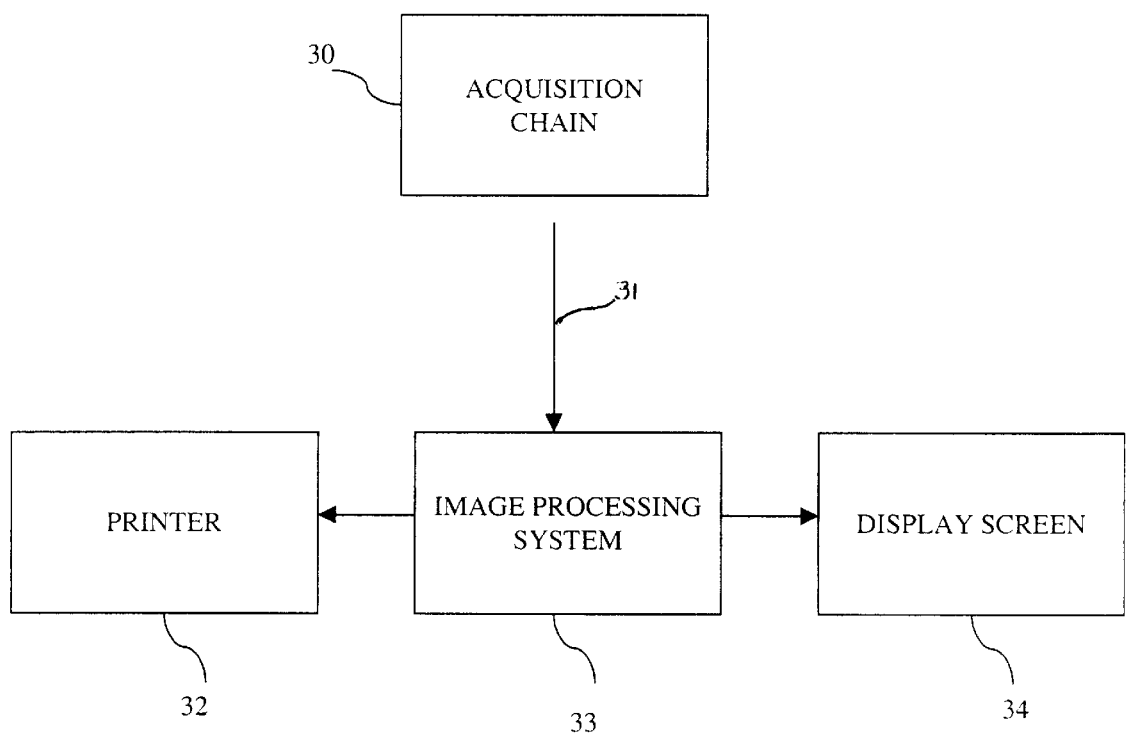
FIG. 3 illustrates a block diagram of a system of use of the method according to an embodiment of the invention.

FIG. 3 illustrates a system of use of the method, comprising an acquisition chain on automatic mode 30, an image processing system 33, a printer 32 and a display screen 34.

The link 31 makes possible the transition of digital images 13 and 18 of the acquisition chain 30 to the image processing system 33 containing an interface specific for the reception of streams of digital data.

It is also possible for the link 31 to represent the transfer of images by means of a diskette or digital cassette compatible with a means of reading of the image processing system 33.

That image processing system 33 can belong to a microcomputer powerful enough to perform the image processing operations and with a memory capacity sufficient to store images 13 and 18. It can also incorporate a digital data acquisition card directly connected to the acquisition chain 30 by means of a cable.

The user has the choice of having the final image 29 calculated transferred to a printer 32 or any other image printing means and/or to the display screen 34 for an instantaneous diagnosis.

The invention thus described makes it possible to delimit the breast more precisely in the image formed, which then makes the user feel more comfortable.

Various modifications in structure and/or steps and/or function may be made by one skilled in the art without departing from the scope of the invention.

What is claimed is:

1. A method of saturation management of a final radiographic exposure image of an object in which there are one or more saturation areas comprising the steps of:
   acquiring a first image in an acquisition chain using a low-dose preexposure of the object;
   acquiring a second image using normal-dose exposure of the object;
   a mask is made from the second image by taking into account the saturation areas; and
   determining the final image by applying the mask to the first image.

2. The method of claim 1, wherein:
   determining the coverage areas corresponding to the saturation areas of the exposure image on the preexposure image by using the mask and the area complementing the junction of the coverage areas set at a zero gray level;
   carrying out digital standardization processing certain gray levels of both the exposure image and the preexposure image;
   determining the final image from a combination of the two images thus processed.

3. The method according to claim 2 wherein the mask is made by detecting all the gray levels higher than a saturation gray level linked to a detector of the acquisition chain.

4. The method according to claim 2, wherein the digital standardization processing is carried out by enhancing the gray level of the coverage areas on the preexposure image to the same gray level as the unsaturated areas of the exposure image.

5. The method according to claim 3, wherein the digital standardization processing is carried out by enhancing the gray level of the coverage areas on the preexposure image to the same gray level as the unsaturated areas of the exposure image.

6. The method according to claim 4, wherein the final image is obtained through the junction of the unsaturated areas of the exposure image with the enhanced coverage areas of the preexposure image.

7. The method according to claim 5, wherein the final image is obtained through the junction of the unsaturated areas of the exposure image with the enhanced coverage areas of the preexposure image.

8. The method according to claim 2, wherein the mask is limited to a saturated part of the exposure image corresponding to a peripheral region of the object.

9. A system of saturation management of a radiographic exposure image, comprising:
   an acquisition chain capable of elaborating, in addition to the exposure image containing a saturation area, a second preexposure image of weaker gray level;
   an image processing system containing:
   a means of detection of the pixels of the saturated area of the exposure image in order to form a mask;
   a means of detection of a coverage area on the second image, the coordinates of whose pixels correspond to the coordinates of the pixels of the saturated area of the exposure image;
   a means of enhancement of the gray levels of the coverage area to the same gray level as the unsaturated area of the exposure image;
   a means of addition of the enhanced coverage area of the second image with the unsaturated area of the exposure image in order to obtain the unsaturated final image; and
   at least one system of display of the final image.

10. A system according to claim 9, wherein the acquisition chain operates on automatic mode, for which a first low-dose preexposure supplies a preexposure image and a normal-dose radiation supplies an exposure image.

11. A method of saturation management of a radiographic image of an object comprising:
   acquiring an image of the object exposed to a low-dose radiation;
   acquiring an image of the object exposed to a normal-dose radiation having at least one saturation area;
   determining a mask from the normal-dose image by taking into the saturation areas into account; and
   forming a final image by applying the mask to the low-dose image.

12. The method of claim 11 comprising:
   determining coverage areas corresponding to the saturation areas of the normal-dose image on the low-dose image by using the mask and the area complementing a junction of the coverage areas set at a zero gray level; and
   determining the final image from a combination of the normal-dose and low-dose images.

13. The method of claim 11 wherein the mask is made by detecting all gray levels higher than a saturation gray level linked to a detector of an image acquisition.

14. The method of claim 12 wherein the mask is made by detecting all gray levels higher than a saturation gray level linked to a detector of an image acquisition.

15. The method of claim 12 comprising:
   processing the gray level of the coverage areas on the low-dose image to the same gray level as unsaturated areas of the normal-dose image.

16. The method of claim 13 comprising:

processing the gray level of the coverage areas on the low-dose image to the same gray level as unsaturated areas of the normal-dose image.

17. The method of claim 12 wherein the final image is obtained through a junction of unsaturated areas of the normal-dose image with the coverage areas of the low-dose image.

18. The method of claim 15 wherein the final image is obtained through a junction of unsaturated areas of the normal-dose image with the coverage areas of the low-dose image.

19. The method of claim 12 wherein the mask is limited to a saturated part of the normal-dose image corresponding to a peripheral region of the object.

20. A system for saturation management of a radiographic image of an object comprising:

means for acquiring a low-dose image of the object;

means for acquiring a normal-dose image of the object having at least one saturation area;

means for forming a mask from the normal-dose image by taking the saturation areas into account; and means for forming a final image by applying the mask to the low-dose image.

21. The system of claim 20 comprising:

means for detection of pixels of the saturated area in order to form the mask; and means for detection of a coverage area of the low-dose image so that pixels of the low-dose correspond to coordinates of the pixels of the saturated area of the normal-dose image.

22. The system of claim 21 comprising:

means for enhancement of gray levels of the coverage area to the same gray level as the unsaturated areas of the normal-dose image.

23. The system of claim 22 comprising:

means for addition of the enhanced coverage area of the low-dose image with the unsaturated area of the normal-dose image in order to obtain an unsaturated final image.

24. The system of claim 20 wherein:

the system operates in an automatic mode for providing the low-dose and normal dose images.

25. The method of claim 1 wherein the exposure image and the preexposure image is an x-ray of a breast.

26. The system of claim 9 wherein the exposure and preexposure is a mammographic image.

27. The method of claim 11 when applied to mammography.

28. The system of claim 20 wherein the radiographic image is a mammography.

29. The method according to claim 1 wherein the first and second images are superimposed.

30. The system according to claim 9 wherein the exposure and preexposure images are superimposed.

31. The method according to claim 11 wherein the low-dose image and the normal-dose image are superimposed.

32. The system according to claim 20 wherein low-dose image and the normal-dose image are superimposed.

33. A method of saturation management of a radiographic exposure image in which there are one or more saturation areas comprising the steps of:

acquiring the image after a mammogram on an acquisition chain in automatic mode using a low-dose preexposure;

a mask is made from the exposure image by taking the saturation areas into account;

determining the coverage areas corresponding to the saturation areas of the exposure image on the preexposure image by using the mask and the area complementing the junction of the coverage areas set at a zero gray level;

carrying out a digital standardization processing of certain gray levels of both the exposure image and the preexposure image wherein the digital standardization processing is carried out by enhancing the gray level of the coverage areas on the preexposure image to the same gray level as the unsaturated areas of the exposure image; and determining the final image from a combination of the two images thus processed.

34. The method according to claim 33 wherein the mask is made by detecting all the gray levels higher than a saturation gray level linked to a detector of the acquisition chain.

35. The method according to claim 33 wherein the final image is obtained through a junction of the unsaturated areas of the exposure image with the enhanced coverage areas of the preexposure image.

36. The method according to claim 33 wherein the mask is limited to a saturated part of the exposure image corresponding to a peripheral region of the x-rayed breast.

* * * * *